United States Patent [19]
Tamai et al.

[11] Patent Number: 5,728,791
[45] Date of Patent: Mar. 17, 1998

[54] POLYVINYL GRAFT-POLYMERS AND MANUFACTURING METHOD THEREOF

[75] Inventors: Kazuhiko Tamai; Kazuya Yonezawa, both of Kobe, Japan

[73] Assignee: Kanegafuchi Kagaku Kogyo Kabushiki Kaisha, Osaka, Japan

[21] Appl. No.: 557,329

[22] Filed: Nov. 14, 1995

Related U.S. Application Data

[63] Continuation-in-part of Ser. No. 227,096, Apr. 13, 1994, abandoned, which is a continuation of Ser. No. 915,823, PCT/JP91/016421 filed on Nov. 29, 1991, abandoned.

[30] Foreign Application Priority Data

Nov. 30, 1990 [JP] Japan ................... 2-339940

[51] Int. Cl.$^6$ ............ C08F 24/00; C08F 269/00; C08F 20/18; C08F 20/42; C08F 12/08; C08F 16/14
[52] U.S. Cl. ............. 526/273; 525/286; 526/320; 526/328; 526/341; 526/332; 526/346
[58] Field of Search .................. 526/273, 320, 526/328, 332, 341, 346; 525/284, 286

[56] References Cited

U.S. PATENT DOCUMENTS

| | | | |
|---|---|---|---|
| 5,166,273 | 11/1992 | Kobayashi et al. | 525/286 |
| 5,294,673 | 3/1994 | Deguchi et al. | 525/286 |
| 5,349,027 | 9/1994 | Ueki et al. | |

FOREIGN PATENT DOCUMENTS

| | | |
|---|---|---|
| 61-227 | 1/1986 | Japan. |
| 61-148215 | 7/1986 | Japan. |
| 63-037109 | 2/1988 | Japan. |
| 63-37109 | 2/1988 | Japan. |

*Primary Examiner*—Joseph L. Schofer
*Assistant Examiner*—Wu C. Cheng
*Attorney, Agent, or Firm*—Armstrong, Westerman, Hattori, McLeland & Naughton

[57] ABSTRACT

The present invention provides a polyvinyl graft-polymer having one structural unit having a glycidyloxy group represented by the following general formula (I) at side chains of the polyvinyl polymer per 2–1,000 repeating units of vinyl:

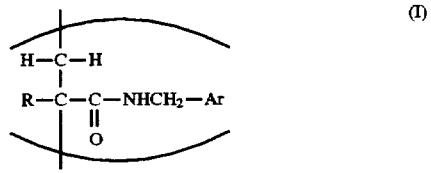

(I)

wherein Ar represents an aromatic hydrocarbon group 6–23 in carbon number having at least one glycidyloxy group, and R represents hydrogen atom or methyl group, and its manufacturing method. The polyvinyl graft-polymer of the present invention is excellent not only in mechanical properties and heat resistance, but also in adhesiveness, paintability dyeability and antistatic property.

4 Claims, No Drawings

POLYVINYL GRAFT-POLYMERS AND MANUFACTURING METHOD THEREOF

TECHNICAL FIELD OF THE INVENTION

This application is a continuation-in-part of application Ser. No. 08/227,096, filed Apr. 13, 1994, abandoned, which is a continuation of application Ser. No. 07/915,823, filed Jul. 28, 1992, abandoned, which is a §371 of PCT/JP91/016421, filed Nov. 29, 1991 and relates to a novel polyvinyl graft-polymer and a manufacturing method thereof. More particularly, it relates to a polyvinyl graft-polymer having glycidyloxy groups and improved in mechanical properties such as heat resistance, dyeability, paintability et cetera, and a manufacturing method thereof.

BACKGROUND OF THE INVENTION

For improving the mechanical strength, heat resistance et cetera of a polyvinyl polymer, there is known a method of copolymerizing it with one or more than two kinds of vinyl monomers. However, a polyvinyl polymer manufactured by such a method is not necessarily improved in properties and there has been a need for further improvement.

The present invention is aimed at providing a polyvinyl graft-polymer for meeting the aforementioned need by copolymerizing a specific compound having glycidyloxy groups.

DISCLOSURE OF THE INVENTION

The present invention, in a first aspect, is aimed at providing a modified polyvinyl graft-polymer having at least one structural unit of glycidyloxy groups represented by the following general formula (I) at side chains of the polyvinyl polymer per 2–1,000 repeating units of vinyl:

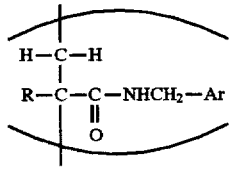

(I)

wherein Ar represents an aromatic hydrocarbon group 6–23 in carbon number having at least one glycidyloxy group, and R represents hydrogen atom or methyl group.

The present invention is, in a second aspect, to provide a method for manufacturing the aforementioned modified polyvinyl graft-polymer which comprises graft-polymerizing (A) a polyvinyl polymer and (B) a compound having glycidyloxy group represented by the following general formula (III) in the presence of (C) a radical polymerization initiator:

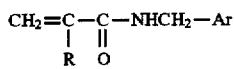

(III)

wherein Ar and R are the same as in the general formula (I).

BEST MODE FOR PRACTICING THE INVENTION

Hereinafter the present invention will be explained in greater detail.

An important constituent element of the present invention is a structural unit having a glycidyloxy group represented by the following general formula (I):

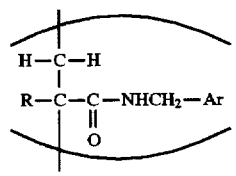

(I)

wherein Ar represents an aromatic hydrocarbon group 6–23 in carbon number having at least one glycidyloxy group and R represents hydrogen atom or methyl group. It derives from a compound having at least one acryl amide group and a glycidyloxy group, respectively.

Such compounds can be manufactured by a method described in the Japanese Laid-open Patent Publication No. 130580/'85.

For example, when 2,6-xylenol and N-methylol acrylamide are used as starting materials, a compound represented by the following structural formula (IV) will be obtained:

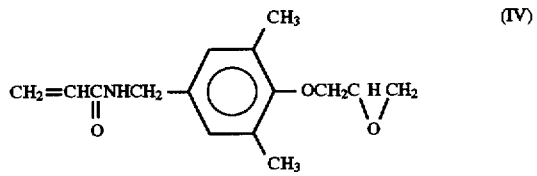

(IV)

The modified polyvinyl graft-polymers of the present invention contain one structural unit having glycidyloxy groups of the aforementioned general formula (I) at side chains of the polyvinyl polymer per 2–1,000, preferably 2–200 repeating units of vinyl. The amide bond in the structural unit of the general formula (1) improves dyeability and paintability, while the glycidyloxy group contributes to an improvement of not only mechanical strength and heat resistance but also of affinity when it is blended with other resin components. If the proportion of the structural units having glycidyloxy group represented by the general formula (I) is less than the aforementioned proportion, no sufficient properties-improving effect is obtainable, while if this proportion is too high, it is not preferable, either, for beneficial innate properties of polyvinyl resin are lost; deterioration of the thermoplasticity being resulted.

In the modified polyvinyl graft-polymers of the present invention, the structural units represented by the general formula (I) may exist at side chains of the polymer as grafts. There is no particular limitation for the molecular weight of the polyvinyl polymers, but preferably it may be in a range of 3,000–1,000,000 and more preferably 5,000–300,000.

There is no particular limitation about the method for manufacturing the modified polyvinyl graft-polymers but the following method may be particularly suitable.

That is, a method is proposed, in which a polyvinyl polymer (A) and a compound (B) having a glycidyloxy group represented by the general formula (III)

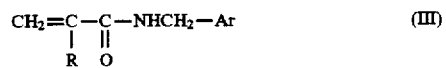

(III)

wherein Ar and R are the same as in the general formula (I), are subjected to graft-copolymerization by the use of a radical polymerization initiator (C) in a solution or water in the presence of a dispersing agent. Another method is proposed in which the aforementioned ingredients (A), (B) and (C) are meltkneaded using a heating and kneading apparatus such as an extruder.

As the vinyl polymers used in the present invention, there may be included homopolymers of styrene, methyl methacrylate, butyl acrylate, α-hydroxy acrylate, trimethylolpropane triacrylate, ethylene glycol dimethacrylate, acrylonitrile, or vinyl ethers such as methyl vinyl ether, ethyl vinyl ether, isopropyl vinyl ether, n-propyl vinyl ether, isobutyl vinyl ether, n-amyl vinyl ether, isoamyl vinyl ether and 2-ethylhexyl vinyl ether, or copolymers comprising two or more monomers selected from the above monomers. These may be used singly or in combination of two or more.

The compound (B) represented by the general formula (III) may be obtainable by condensing an aromatic hydrocarbon having at least one phenolic hydroxyl group with N-methylol acrylamide or N-methylol methacrylamide or alkyl ether derivatives of N-methylol acrylamide or N-methylol methacrylamide (hereinafter referred to as N-methylol acrylamides) in the presence of an acidic catalyst and then by glycidylization of the phenolic hydroxyl group.

When, for example, 2,6-xylenol and N-methylol acryl amides are used as starting materials, a compound represented by the following structural formula (V) will be obtained:

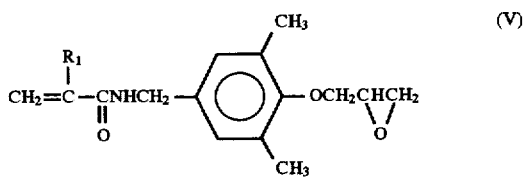

wherein $R_1$ represents hydrogen atom or methyl group.

When ortho-cresol and N-methylol acryl amides are used as starting materials, the resultant compound will be of the following structural formula (VI):

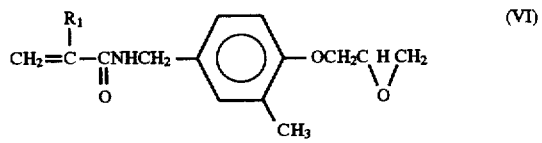

wherein $R_1$ represents hydrogen atom or methyl group.

As the radical polymerization initiator (C) used in the present invention, any known radical polymerization initator may be used.

For example, peroxides such as cumene hydroperoxide, tertiary butylhydroperoxide, benzoyl peroxide, lauroyl peroxide, decanoyl peroxide and acetyl peroxide, or azo compounds such as azobisisobutyronitrile may be used alone or in combination of two or more.

The present invention will be described more specifically with reference to examples, but it is to be noted that the invention is by no means limited thereto.

Unless otherwise indicated, "part" and "%" in the following description mean "weight part" and "weight %", respectively.

Reference Example

A mixture of 102.6 parts of 4-acryl amide methyl-2, 6-dimethyl phenol, 181 parts of epichlorohydrin and 2.27 parts of benzyltriethyl ammonium chloride were stirred for 30 minutes at 100° C. This reaction mixture was cooled to 50° C., 147 parts of 5N sodium hydroxide was dripped thereto in 10 minutes under stirring, this followed by stirring for 1 hour at 45°–50° C.

The resulting reaction mixture was cooled down to the room temperature, this followed by separation after addition of 120 parts of methylisobutylketone and 500 parts of water.

The separated organic layer was rinsed 3 times with 300 parts of water and after dehydration with sodium sulfate anhydride, the solvent was distilled off under reduced pressure and thus N-{4-(2,3-epoxypropoxy)-3,5-dimethylphenylmethyl} acryl amide was obtained. The epoxy equivalent weight measured by the method of JIB K 7236 was 271 and the melting point was 90°–92° C.

EXAMPLE 1

100 part of a polystyrene, 10 parts of N-{4-(2,3-epoxypropoxy)-3,5-dimethylphenyl} acrylamide and 0.1 part of α, α'-bis(t-butylperoxy-m-isopropyl)benzen were blended at room temperature and then the resulting mixture was supplied to a monodirection biaxial extruder heated to 190° C. at a rate of 15 Kg/hr. and melt-kneaded to thus obtain pellets. The obtained pellets were dried under reduced pressure at 60° C. for 5 hours and a polyvinyl graft-polymer (MPV1) was thus obtained.

EXAMPLE 2

A polyvinyl graft-polymer (MPV2) was obtained in the same manner as in Example 1 except that the amount of N-{4-(2,3-epoxypropoxy)-3,5-dimethylphenyl} acrylamide was changed from 10 parts to 5 parts.

EXAMPLE 3

A polyvinyl graft-polymer (MPV3) was obtained in the same manner as in Example 1 except that a polymethyl methacrylate was employed instead of the polystyrene.

Epoxy equivalents of the polyvinyl graft-polymers (MPV1–MPV3) prepared in Examples 1–3 and affinities of said graft-polymers with other resins which were blended were measured according to the methods as set forth below. The results are shown in Table 1.

(1) Epoxy equivalent

Each of the polyvinyl graft-polymers was dissolved in methylene chloride and the resulting solution was added dropwise into methanol gradually and filtered. The obtained white powder was dried under reduced pressure at 60° C. The thus obtained reprecipitated polyvinyl graft-polymer was tested for an epoxy equivalent according to JIS K 7236.

(2) Affinity with other resins 80 parts of a polyethylene terephthalate, 10 parts of a polystyrene and each of polyvinyl graft-polymers prepared in Examples 1–3 were blended at room temperature add the resulting mixture was supplied to a monodirection biaxial extruder heated to 190° C. at a rate of 18 Kg/hr. and melt-kneaded for pelletization. The obtained pellets were dried under reduced pressure at 120° C. for 8 hours and subjected to injection molding to thus obtain a ⅛-inch dumbbell specimen (2-1) The surface condition of the dumbbell specimen was evaluated visually according to the following criteria:

o: Gloss is observed on its surface and peeling is not observed.

x: Peeling is observed on its whole or partial surface.

(2-2) The central part of the dumbbell specimen was cut with a microtome having a diamond knife and the cut piece was immersed in methylene chloride for 5 minutes. Thereafter, the cut surface was observed with a scanning electron microscope and average dispersed particle sizes of the polystyrene and the polyvinyl graft-polymer were measured by an image analysis method.

Comparative Example 1

The affinity with other resins blended was evaluated in the same manner as above except that 10 parts of the polystyrene were employed instead of 10 parts of the polyvinyl Start-polymer. The results are shown in Table 1.

Comparative Example 2

The affinity with other resins blended was evaluated in the same manner as above except that 10 parts of the polymethyl methacrylate were employed instead of 10 parts of the polyvinyl graft-polymer. The results are shown in Table 1.

TABLE 1

|  | Epoly equivalent (g/eq.) | Surface peeling | Average dispersed particle size (μm) |
|---|---|---|---|
| Example |  |  |  |
| 1 | 3,950 | ○ | 0.7 |
| 2 | 8,100 | ○ | 0.9 |
| 3 | 4,250 | ○ | 0.6 |
| Comp. Example |  |  |  |
| 1 | — | X (Peeling is noticeable.) | 3.9 |
| 2 | — | X (Peeling is noticeable.) | 3.2 |

POSSIBILITY OF INDUSTRIAL UTILIZATION

Polyvinyl graft-polymers of the present invention can have improved dyeability, paintability, adhesive property and electrostatic behavior according to the kind of polar group incorporated such as amide groups and glycidyloxy groups. With these features, the polyvinyl graft-polymers of the present invention are widely applicable as molding materials of various kinds including, for example, fibers, films and foamed articles.

Especially, glycidyloxy groups are effective for marked improvement of affinity with other resins blended, and thus the polyvinyl graft-polymers of the present invention are useful as a modifier or a compatibility improver of other resins.

What is claimed is:

1. A polyvinyl graft-polymer having one structural unit of glycidyloxy groups represented by the following general formula (I) at side chains of the polyvinyl polymer per 2–1,000 repeating units of vinyl:

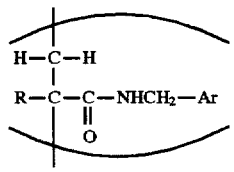

wherein Ar represents an aromatic hydrocarbon group 6–23 in carbon number having at least one glycidyloxy group, and R represents hydrogen atom or methyl group, said polyvinyl polymer being at least one selected from the group consisting of homopolymers of styrene, methyl methacrylate, butyl acrylate, α-hydroxy acrylate, trimethylolpropane triacrylate, ethylene glycol dimethacrylate, acrylonitrile, and vinyl ethers selected from the group consisting of methyl vinyl ether, ethyl vinyl ether, isopropyl vinyl ether, n-propyl vinyl ether, isobutyl vinyl ether, n-amyl vinyl ether, isoamyl vinyl ether and 2-ethylhexyl vinyl ether, and copolymers comprising two or more monomers selected from the above monomers.

2. The polyvinyl graft-polymer of claim 1, wherein said polyvinyl polymer is a polystyrene, a polymethyl methacrylate or a mixture thereof.

3. The polyvinyl graft-polymer of claim 1, wherein said structural unit having the glycidyloxy group is represented by the following formula (II):

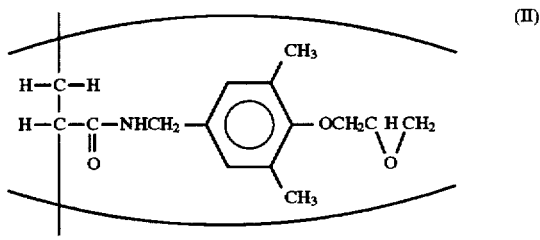

4. A method for manufacturing a polyvinyl graft-polymer which comprises subjecting two components, a polyvinyl polymer (A) and a compound (B) having glycidyloxy group represented by the following general formula (III):

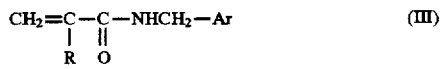

wherein Ar represents an aromatic hydrocarbon group 6–23 in carbon number having at least one glycidyloxyl group, and R represents hydrogen atom or methyl group, to graft-polymerization by the use of a radical polymerization initiator (C), said polyvinyl polymer being at least one selected from the group consisting of homopolymers of styrene, methyl methacrylate, butyl acrylate, α-hydroxy acrylate, trimethylolpropane triacrylate, ethylene glycol dimethacrylate, acrylonitrile, and vinyl ethers selected from the group consisting of such as methyl vinyl ether, ethyl vinyl ether, isopropyl vinyl ether, n-propyl vinyl ether, isobutyl vinyl ether, n-amyl vinyl ether, isoamyl vinyl ether and 2-ethylhexyl vinyl ether, and copolymers comprising two or more monomers selected from the above monomers.

* * * * *